April 21, 1953 V. F. BOZEMAN, SR 2,635,405
BEET HARVESTER
Original Filed Nov. 6, 1944
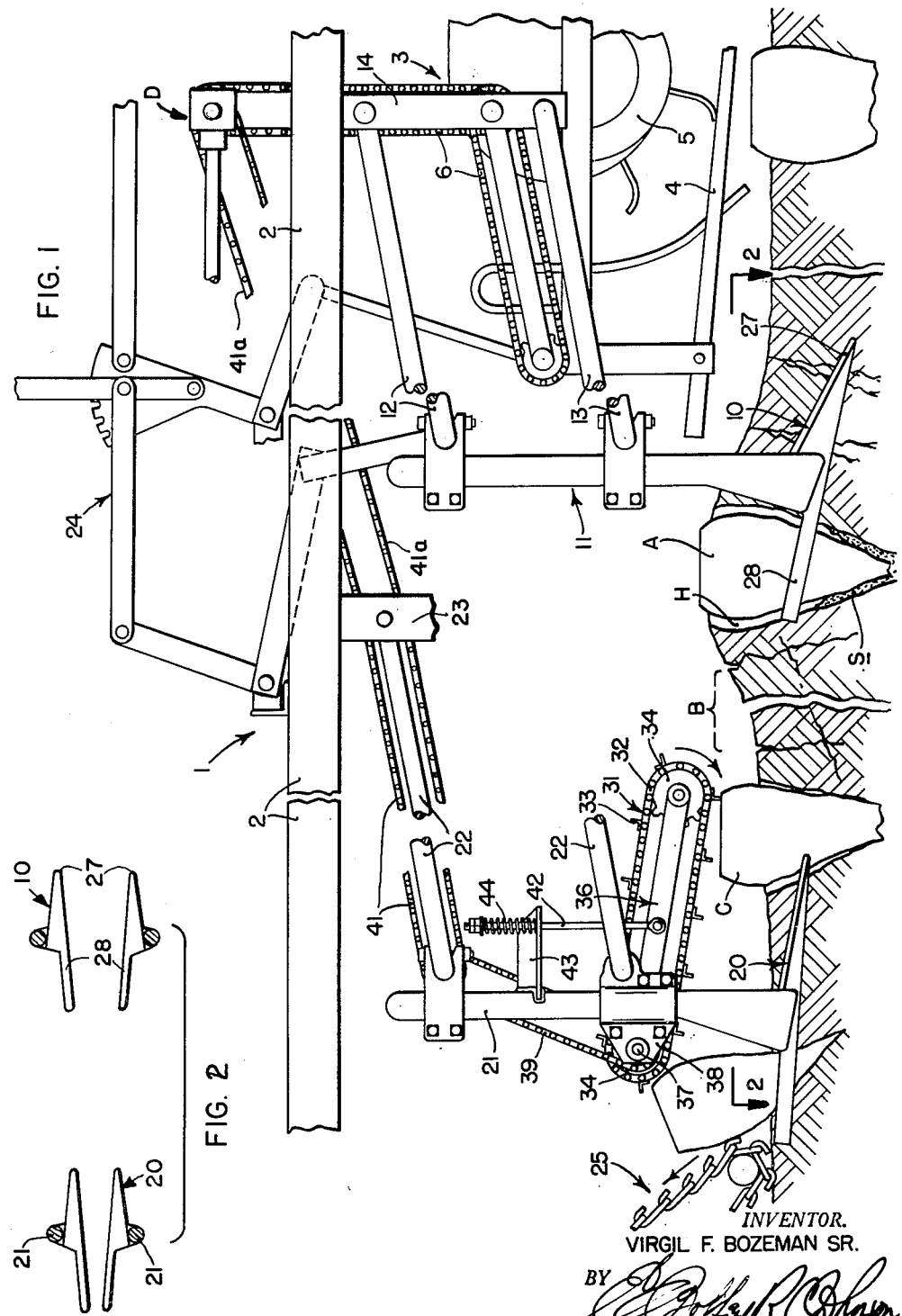
INVENTOR.
VIRGIL F. BOZEMAN SR.
BY
ATTORNEYS Patented Apr. 21, 1953

2,635,405

UNITED STATES PATENT OFFICE 2,635,405

BEET HARVESTER

Virgil F. Bozeman, Sr., Moline, Ill., assignor to Deere & Company, Moline, Ill., a corporation of Illinois Continuation of application Serial No. 562,176, November 6, 1944. This application June 2, 1949, Serial No. 96,792

1 Claim. (Cl. 55—106)

This application is a continuation of my co-pending application, Serial No. 562,176, filed November 6, 1944, now abandoned.

The present invention relates generally to beet harvesters and similar agricultural implements, and is more particularly concerned with improved lifting means for loosening the beets from the ground and lifting them preparatory to the transfer of the lifted beets into a harvester or other means.

The object and general nature of the present invention is the provision of new and improved beet lifting means which is especially constructed to eliminate clods and to lift the beets somewhat higher with respect to the ground surface than has heretofore been considered practical. In the mechanical harvesting of beets and similar root crops, in certain sections of the country, such as, for example, certain irrigated districts, at the time of the harvest the ground is rather hard and the use of ordinary lifters has resulted in breaking the ground into chunks or clods about the same size as the beets themselves. Mechanical harvesters are sometimes unable to separate all of the clods from the beets, and it is a principal feature of this invention to provide lifting mechanism which lifts the beets substantially free of clods and the like, particularly clods of a size that tends to pass through the machine with the beets.

More specifically, it is a feature of this invention to provide lifting means operable in two stages. The first stage is a ground loosening and a partial raising of the beets, followed by what is, in effect, a holding of the beets in their partially raised position until, first, sufficient soil falls into the hole to substantially retain the beets in their partially raised position, and, second, any clods or chunks of earth roll or fall away from the row. The second stage consists of additional raising means operating close to the surface of the ground and in the soil already loosened by the first stage lifting, for completing the lifting of the partially raised beet but without causing any of the clods to be raised. The over-all result of this is to raise the beets somewhat higher than has heretofore been possible, and this materially facilitates the passage of the beets into a beet elevator or other handling or receiving means while leaving all of the clods on the ground.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a fragmentary side view of a beet harvester in which the present invention has been incorporated.

Figure 2 is a fragmentary sectional view taken along the line 2—2 of Figure 1.

Referring now to the drawing, the reference numeral 1 indicates a beet harvester which, so far as the present invention is concerned, may be of any suitable type but it has been illustrated as similar to the beet harvester shown in the co-pending United States application, Serial No. 557,696, filed by Claude W. Walz, Robert D. Griff, Howard F. Clausen, and myself, October 7, 1944, now U. S. Patent 2,470,211, issued May 17, 1949. Briefly, the beet harvester includes a mobile or wheel supported frame 2 having a beet topping unit 3 including a top severing knife 4 and a top removing drum 5. The frame 2 carries suitable means, such as a motor, for driving the various parts of the harvester, the drive being transmitted to the drum 5 by means of sprocket and chain gearing indicated by the reference numeral 6. The drive just mentioned, which is shown at D in Figure 1, is substantially the same as that shown in the above-mentioned Patent 2,470,211.

According to the principles of the present invention, a first pair of lifter points 10 is provided, these points being secured to the lower end of a tool supporting shank or standard 11. The latter, in turn, is connected with the frame 2 for vertical movement by a pair of bails 12 and 13. The forward ends of the bails 12 and 13 are pivotally connected with a standard 14 fixed to the frame 2 in any suitable manner.

Spaced rearwardly from the first set of lifter points 10 is a second pair of lifter points 20. These points are substantially the same in constructional details as the lifter points 10 but are set at somewhat less inclination than the points 10. The points 20 are fixed to a point supporting shank or standard 21 which is connected with the frame 2 in any suitable way, as by bails 22 pivoted at their forward ends to a frame standard 23. The bails 12 and 22 are connected to any suitable operating mechanism, such as the linkage indicated at 24 for raising and lowering the points 10 and 20, either together or one relative to the other, as desired. A beet receiving elevator 25 is disposed just rearwardly of the rear set of points 20 and operates in a conventional manner to receive the beets from the rear set of points 20.

In operation, the first set of points 10 are set to operate fairly deep and at an appreciable angle. Each of the points 10 includes a soil entering section 27 and a lifting rod section 28. The points 10 per se are largely conventional, the point sections 27 being spaced apart a considerable distance in order to embrace the beets and loosen the ground adjacent the beets while the rod or tail portions 28 converge rearwardly and upwardly so as to exert a lifting force on the beets. The rear sections 28 of the points are sufficiently long so that during the progress of the machine along a row the points 10 not only loosen the ground and the beets but in raising the beets the tail sections hold the beet elevated a sufficient length of time to provide an opportunity for soil to fall back into the hole H from which the beet was lifted, the soil falling back into the hole being indicated by the reference character s. Thus, the beets after the passage of the first set of points 10 are left in a slightly or partially raised position, and the space between the front set of points 10 and the rear set of points 20 is sufficient to give an opportunity for sufficient soil to settle down into the hole to insure that the beets themselves will not settle down after being partially raised by the front points 10. After the front points 10 have passed the beet the space between the front and rear points provide an opportunity for loose clods and excess soil to fall away from the row, either to one side or the other before the rear points 20 come into action. The drawing illustrates the beet A as being lifted by the passage of the front points 10, the ground being loosened by the points and the tail portions 28 serving momentarily to hold the beet A in a raised position while some soil falls into the hole H, as indicated at S. Clods and the like tend to roll to one side or the other after the passage of the points 10, and this is indicated in the drawing by the space B. While the clods and excess loosened soil, originally raised by the front points 10, roll away or spill off laterally, the beet settles back slightly, as indicated at C, but although the beet C is slightly lower than beet A, the beet C projects a considerable distance above the ground surface further than the beet A. This provides opportunity to use the more shallow rear set of points 20 to complete the raising of the beets without causing any substantial amount of soil and/or clods to enter the beet elevator 25.

The rear points 20 are set to operate closely adjacent the ground surface and mainly in the soil already loosened by the front points 10. The rear points 20 are disposed in a somewhat higher position than the points 10 so that during the progress of the machine, when the partially raised beets, being partially raised and loosened from the surrounding soil by the front points 10 as described above, are engaged by the rear points 20, the beets are raised an additional amount yet the points 20 operate so shallow with respect to the ground surface that they do not engage any of the larger chunks or pieces of soil or clods loosened or broken up by the front points 10. In thus raising the beets an additional amount, over and above that through which they have been raised by the front points 10, yet without engaging any clods or the like, the rear points 20 serve efficiently to raise the beets up to a point where they may readily be engaged by the beet elevator 25 and conveyed to a point of utilization while leaving all the clods and the like behind.

Due to the fact that the beets approaching the rear points 20 extend a considerable distance above the ground surface, it is desirable to provide means for holding the beets upright and to prevent the rear points from pushing the beets over forwardly. To this end, I provide a hugger chain 31 which is driven by suitable connections with the motor of the harvester. Preferably, the hugger chain 31 includes a pair of endless chains 32 connected by cross angles 33 and operating over pairs of sprockets 34. The sprockets are carried in a hugger chain frame 36 which is pivoted, as at 37, on a pair of brackets 38 supported on the rear point standards 21. The pivot 37 is defined by a drive shaft on which the rear sprockets 34 are fixed, and the driving means for the shaft 37 includes a driving chain 39 extending upwardly and operating over a double sprocket driven by a forwardly extending drive chain 41. The latter is driven in any suitable manner, as by a connection 41a with the driver means D for the drum 5. A rod 42 is pivoted at its lower end to the hugger chain frame 36 and at its upper end passes through a bracket 43 where the rod receives a compression spring 44. This spring serves to support the forward end of the hugger chain unit in operating position, as shown. The hugger chain is driven in the direction of the arrow shown in the drawing and is operated at a speed approximating the speed of travel of the machine, or slightly greater, so as to hold the beets in an upright position and materially facilitates their entrance into the beet elevator 25.

While I have shown and described above, the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

In a beet harvester of the type including topping means and including a mobile support carrying said means, the improvement comprising a pair of beet lifting means adapted to be carried by said support rearwardly of said topping means and spaced in a fore and aft direction, both of said lifting means being adapted to be positioned on said support so as to enter the ground, the first lifting means loosening the ground and partially raising the beets, and the second lifting means completing the raising of the beets, there being a generally fore-and-aft extending, substantially uninterrupted space between said two lifting means and said first lifting means including a pair of beet lifting members, each having a forward beet-engaging point section and, rearwardly thereof, an upwardly and rearwardly extending tail portion, said tail portions converging rearwardly beyond the rear end of the associated beet-engaging point sections, whereby there is a substantially unobstructed open space beneath the tail portions of said first lifting means so as to permit quantities of soil to fall back in the hole from which the beet was raised by the first lifting means and thereby prevent the beet from settling back into its original position, and said second lifting means being disposed above said first lifting means so as to operate closely adjacent the ground surface but just underneath the latter, said second lifting means comprising beet-engaging members disposed in a more nearly horizontal position than said first lifting means, whereby the formation of clods approximating the size of the beets is substantially eliminated.

VIRGIL F. BOZEMAN, Sr.

References Cited in the file of this patent

UNITED STATES PATENTS

| Number | Name | Date |
|---|---|---|
| 1,100,969 | Glinke | June 23, 1914 |
| 1,271,076 | Pratt | July 2, 1918 |
| 1,881,145 | Stolze | Oct. 4, 1932 |
| 2,018,183 | Lundgren | Oct. 22, 1935 |
| 2,072,186 | Sishc | Mar. 2, 1937 |
| 2,452,418 | Zuckerman | Oct. 26, 1948 |